United States Patent Office 3,377,335
Patented Apr. 9, 1968

3,377,335
REACTIVE DISAZO DYESTUFFS
Rudolf Dürig, Basel, and Werner Bossard, Riehen, Switzerland, assignors to J. R. Geigy A.G., Basel, Switzerland
No Drawing. Filed Sept. 14, 1964, Ser. No. 396,422
Claims priority, application Switzerland, Sept. 18, 1963, 11,524/63
7 Claims. (Cl. 260—146)

ABSTRACT OF THE DISCLOSURE

Fiber reactive disazo-dyestuffs are provided. Such dyestuffs in the free acid form represent a member selected from the group consisting of a benzene-azo-benzene-azo-naphthalene disazo-dyestuff and a benzene-azo-naphthalene-azo-naphthalene disazo-dyestuff, the metallizable substituents of which member are in ortho-positions to the azo bridge linking the terminal naphthalene nucleus to the remainder of the dyestuff molecule, and the fiber-reactive grouping of which member is a 2,4,5-trichloropyrimidyl-(6)-amino group linked to the terminal benzene nucleus, said member containing a total of from 2 to 4 —$SO_3H$ groups at least two of which are at the terminal naphthalene nucleus. The invention also provides 1:1 copper metal complexes of the disazo dyestuffs.

---

The present invention concerns new reactive, copper-containing disazo dyestuffs, a process for the production thereof, their use for the dyeing of cellulose and polyamide material as well as, as industrial products, the material dyed therewith.

The novel reactive dyestuffs according to the invention are: (a) fiber-reactive sulfonated metallizable disazo dyestuffs of the benzene-azo-benzene-azo-naphthalene series and of the benzene-azo-naphthalene-azo-naphthalene series, the metallizable substituents of which are in ortho-position to the azo bridge linking the terminal naphthalene nucleus to the remainder of the dyestuff molecule, and the fiber reactive grouping of which is the 2,4,5-trichloropyrimidyl-(6)-amino group and is linked, in contrast to known disazo dyestuffs of the above-mentioned series, to the terminal benzene nucleus, and (b) the copper 1:1 complexes of the aforesaid metallizable disazo dyestuffs.

These dyestuffs acording to the invention are sulfonated by at least two —$SO_3H$ groups at the terminal naphthalene nucleus and from 0 to 2 further —$SO_3H$ groups in the dyestuff molecule.

Especially valuable as dyestuffs for the fiber materials described hereinafter, due to their good all-around dyeing properties, are the dyestuffs according to the invention which in their free acid form fall under the formula

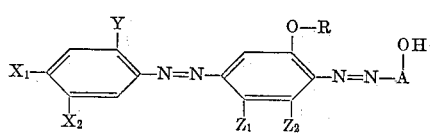

(IA)

wherein:
one of $X_1$ and $X_2$ represents hydrogen and the other the 2,4,5-trichloropyrimidyl-(6)-amino group,
Y represents hydrogen, lower alkyl, lower alkoxy or —$SO_3H$,
$Z_1$ represents hydrogen, lower alkyl, lower alkoxy, hydroxy-lower alkoxy or lower alkoxy-lower alkoxy, and
$Z_2$ repersents hydrogen, or
$Z_1$ and $Z_2$ when taken together represent the grouping

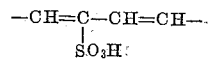

R represents hydrogen, lower alkyl, hydroxy-lower alkoxy or lower alkoxy-lower alkoxy, and

represents a hydroxynaphthyl radical, the hydroxyl group of which is in ortho-position to the azo-bridge, or under the formula

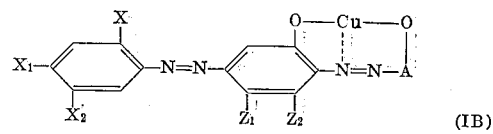

(IB)

wherein $X_1$, $X_2$, Y, $Z_1$, $Z_2$ and

have the same meanings as the corresponding substituents $X_1$, $X_2$, Y, $Z_1$, $Z_2$ and

in the Formula IA.

The total number of —$SO_3H$ groups in the molecule of Formula IA and of Formula IB, respectively, being from 2 to 4, at least two of which —$SO_3H$ groups are linked to A.

Dyestuffs according to the invention are distinguished from known dyestuffs which possess a fiber-reactive trichloropyrimidylamino grouping at the naphthalene nucleus instead of the terminal benzene nucleus, by an unexpectedly high ratio of $$\frac{\text{amount of dyestuff fixed on the fiber}}{\text{amount of dyestuff drawn on the fiber}}$$

The latter amount of dyestuff drawn on the fiber is the amount of dystuff which has been deposited on the fiber during dyeing and is present thereon after the dyed fiber material has been removed from the dyebath.

The former amount of dyestuff is that which remains on the fiber material after the conventional soaping of material after the same has been removed from the dyebath.

In following conventional practice both amounts are given hereinafter in percent of the amount of dyestuff initially present in the dyebath.

The above ratio is a measure of the practical usefulness of a reactive dye in commercial dyeing processes, a ratio of 1:2 being the permissible minimum.

Moreover, many of the above-mentioned known dyestuffs having the reactive grouping at the naphthalene nucleus are excessively substantive and therefore lead to dyeings, especially on cotton or staple fiber which lack wash fastness.

The new metallizable, and especially the new copper-containing reactive azo dyestuffs according to the invention dye cellulose materials such as staple fiber, jute, ramie, hemp and, in particular, cotton, but also polyamide fibers such as natural fibers like wool or silk, or synthetic fibers such as nylon, in blue, navy blue, green, grey or grey-black shades which have excellent wet fastness and also good light fastness properties.

Cellulose fiber materials are advantageously dyed with the dyestuffs according to the invention by the exhaustion method under the conventional conditions for dyeing with fiber-reactive dyes, i.e. by introducing the cellulose fibers to be dyed into a dye bath of long liquor ratio which contains an acid binding agent and, optionally, also neutral salts such as sodium chloride or sodium sulfate, at a slightly raised temperature, gradually heating the bath to temperatures of 80 to 100° C. and completing the dyeing process by fixing of the dyestuff on the fiber at this temperature. If desired, the above-mentioned neutral salts which accelerate the drawing of the dyestuffs on the fibers can be added to the bath only after the actual dyeing temperature has been attained.

Moreover, cellulose fiber material can also be padded or printed, for example, at a low temperature, with a thickened dyestuff solution and the dyestuff is then fixed by treatment with acid binding agents. Examples of such agents are sodium or potassium carbonate, di- and trisodium phosphate, sodium hydroxide solution and, at temperatures of over 50° C., also sodium or potassium bicarbonate.

The treatment with these agents can be performed at room temperature or at a raised temperature. Instead of an alkaline after-treatment of the already impregnated material, the acid binding agent can be added in many cases to the impregnating liquors or printing pastes, and then the dyeing is developed by a short heating at temperatures of over 100–160° C., or by storing for a longer time at room temperature.

The new dyestuffs are chemically bound to the fiber molecules by the treatment with acid binding agents and, after soaping to remove non-fixed dyestuff, the cellulose dyeings in particular have excellent wet fastness properties, as mentioned hereinbefore.

The fiber reactive disazo dyestuffs according to the invention are obtained by reacting an amino disazo dyestuff containing at least two water solubilizing groups of the formula

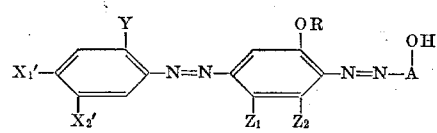

(II)

wherein:

one of $X_1'$ and $X_2'$ represents hydrogen and the other the primary amino group, and $Y, Z_1, Z_2, R$ and

have the above given meanings in any order desired with an agent giving off copper, and with 2,4,5,6-tetrachloropyrimidine, to form the corresponding dyestuff of Formula IB, or without the copper-yielding agent, to form a dyestuff of Formula IA.

"Lower" as used in this specification and the appended claims in connection with "alkyl" or "alkoxy" means that these radicals have from 1 to 4 carbon atoms.

Examples of a lower alkyl group in the position of Y and $Z_1$ are the methyl or ethyl group, as lower alkoxy group these symbols represent the methoxy or ethoxy group.

Advantageously $Z_1$ is the methyl or methoxy group and $Z_2$ is hydrogen.

as the radical of a coupling component of the hydroxynaphthalene series coupled in ortho position to the hydroxyl group, is a di-sulfonated 1-hydroxynaphthyl-(2) or 2-hydroxynaphthyl-(1) radical.

Advantageously

represents a di- or tri-sulfonated 1-hydroxynaphthyl-(2) radical.

The amino disazo dyestuff used as starting material of Formula II is obtained, for example, by coupling the diazonium compound of an amine of the formula

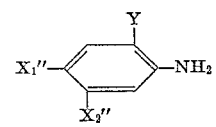

(III)

wherein one of $X_1''$ and $X_2''$ represents hydrogen and the other a substituent which can be converted into the primary amino group such as the nitro group or an acylamino group, in the latter case it is preferably a carbacylamino group such as the acetylamino or benzoylamino group, and Y has the meaning given in Formula II, with a coupling component of the formula

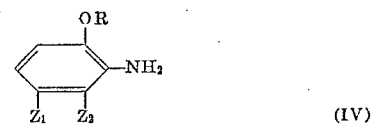

(IV)

wherein R, $Z_1$ and $Z_2$ have the meanings given in Formula IA. The amino monoazo dyestuff is then diazotized, coupled with a coupling component of the formula

(V)

wherein A has the meaning given in Formula IA, and $X_1''$ and $X_2''$ in the disazo dyestuff obtained is converted into the amino group $X_1'$ or $X_2'$ by either reducing the nitro group or saponifying the acylamino group.

Advantageously, the amino disazo dyestuff of Formula II is first coppered and then the copper complex obtained is reacted with 2,4,5,6-tetrachloropyramidine to form the end product of Formula IB.

The amino disazo dyestuff is coppered preferably with water soluble copper-(II) salts, in particular with copper-(II) sulfate, in a weakly acid to alkaline medium, in the latter case particularly an ammonia alkaline medium, optionally in the presence of water-soluble organic bases such as dialkylamines, pyridine or dimethyl formamide.

The copper-containing amino disazo dyestuff is reacted with 2,4,5,6 - tetrachloropyrimidine advantageously in aqueous or aqueous-organic medium at a raised temperature and, preferably, in the presence of agents which buffer acid. The organic part of the aqueous-organic reaction medium consists, in particular, of organic solvents which are miscible with water, such as lower alkanols, e.g. methanol or ethanol; lower aliphatic ketones such as acetone; amides of lower fatty acids such as formamide or dimethyl formamide, or dioxan. Chiefly, alkali metal salts of lower fatty acids, e.g. sodium acetate, are used as agents which buffer acids.

The following non-limitative examples serve to illustrate the invention further. Where not otherwise expressly stated, parts are given as parts by weight. The temperatures are in degrees centigrade. The relationship of parts by volume to parts by weight is as that of millilitres (ml.) to grams (g.).

light. Synthetic resin finishing causes neither change in shade nor worsening of the fastness to light.

Similar dyestuffs having equally good fastness properties are obtained if, instead of the amino disazo dyestuff described in the example, the equivalent amount of an amino disazo dyestuff formed from the components given in Table I is coppered under the conditions described in the example and reacted with 2,4,5,6-tetrachloropyrimidine.

TABLE I

| No. | Nitrodiazonium compound from— | Hydroxy compound | Aminobenzene compound | Shade on cotton |
|-----|-------------------------------|------------------|----------------------|-----------------|
| 2 | 2-amino-5-nitro-1-methoxybenzene | 1-hydroxynaphthalene-3,6,8-trisulphonic acid | 1-amino-3-methoxybenzene | Greenish navy blue. |
| 3 | 2-amino-5-nitro-4-methyl-1-methoxybenzene | do | 1-amino-3-methylbenzene | Do. |
| 4 | 2-amino-5-nitro-1,4-diethoxybenzene | do | do | Olive green. |
| 5 | 2-amino-5-nitro-1-methoxybenzene | do | 1-animobenzene | Navy blue. |
| 6 | do | 2-hydroxynaphthalene-3,6,8-trisulphonic acid | 1-amino-3-methylbenzene | Do. |
| 7 | do | do | 1-animobenzene | Do. |
| 8 | 2-amino-5-nitro-1,4-di-(β-hydroxyethoxy)-benzene | 1-hydroxynaphthalene-3,6,8-trisulphonic acid | do | Olive green. |
| 9 | 2-amino-5-nitro-1-ethoxybenzene | do | do | Navy blue. |
| 10 | 2-amino-5-nitro-1-hydroxybenzene | do | do | Do. |

EXAMPLE 1

65.1 parts of the amino disazo dyestuff of the formula

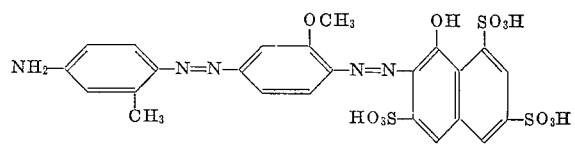

produced by coupling diazotised 2-amino-5-nitro-1-methoxybenzene with 1-hydroxynaphthalene 3,6,8-trisulphonic acid in acetice acid solution, reducing the nitro group with sodium sulphide, diazotising the amino monoazo dyestuff obtained and coupling the latter with 1-amino-3-methylbenzene in the presence of excess sodium acetate, are dissolved in 1000 parts of water and 15 parts of ammonia. 50 parts of diethylamine and 25 parts of copper sulphate in 100 parts of water are added to the solution and the whole is stirred for several hours at 80–85°.

The completely coppered amino disazo dyestuff is salted out with a mixture of sodium chloride and potassium chloride, filtered off and dissolved in 1000 parts of hot water. At 70°, 21.8 parts of 2,4,5,6 - tetrachloropyrimidine are added and the pH is kept at 6.5 by the dropwise addition of 6 parts of sodium carbonate in 30 parts of water. As soon as there is no longer a free amino group, the dyestuff of the formula

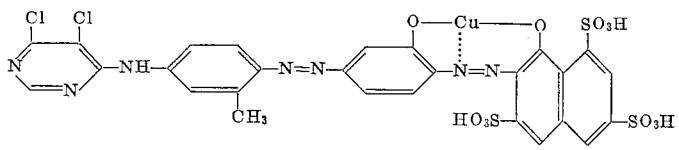

is salted out, dried in vacuo at 60° and milled. It is a blackish powder which dissolves in water with a black-blue and in concentrated sulphuric acid with a greenish blue colour. It dyes natural or regenerated cellulose fibres from a soda alkaline dye liquor in reddish navy blue shades which have excellent fastness to washing and

EXAMPLE 11

65.1 parts of the amino disazo dyestuff of the formula produced by coupling the diazonium compound of 1-amino-4-acetylaminobenzene-2-sulphonic acid with 1-amino-2-methoxy-5-methylbenzene in acetic acid medium, diazotising the amino azo dyestuff obtained, coupling with 1-hydroxynaphthalene-3,6-disulphonic acid in the presence of sodium carbonate and saponifying the acylamino group with sodium hydroxide, are dissolved in 1000 parts of hot water. The solution is stirred for several hours at 85–90° with 200 parts of a solution containing 25 parts of crystallised copper sulphate and 100 parts of concentrated aqueous ammonia, and with 50 parts of dimethyl formamide.

On completion of the copper complex formation, the amino disazo dyestuff is precipitated by the addition of sodium chloride, filtered off and again dissolved in 1000 parts of hot water. 21.8 parts of finely pulverised 2,4,5,6-tetrachloropyrimidine are sprinkled into this solution at 70° and the pH of the dyestuff solution is kept at 6.5 by the simultaneous addition dropwise of dilute sodium carbonate solution.

As soon as no more primary amine can be traced, the dyestuff of the formula

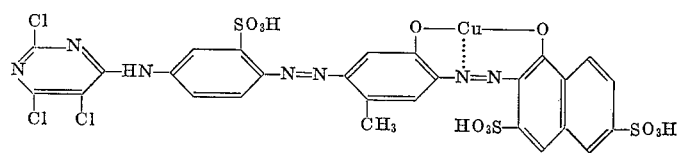

is isolated by salting out, dried in vacuo at 60° and milled. It is a dark powder which dissolves in water with a dark blue colour and dyes natural and regenerated cellulose material from a soda alkaline dye liquor in navy blue shades which have excellent fastness to washing and light.

Dyestuffs having similarly good fastness properties are obtained if the amino disazo dyestuff described in this example is replaced by the equivalent amount of another amino disazo dyestuff formed from the diazo and coupling components given in columns II, III and IV of the following Table II, and this is coppered and reacted with 2,4,5,6-tetrachloropyrimidine.

solution, are dissolved in 1000 parts of hot water. 21.8 parts of finely pulverised 2,4,5,6-tetrachloropyrimidine are added to the solution at 70°, the pH of the dyestuff solution being kept at 6.5 by the simultaneous addition dropwise of dilute sodium carbonate solution. As soon as no more primary amine can be traced, 25 parts of crystallised copper sulphate dissolved in 100 parts of water, and also 40 parts of crystallised sodium acetate dissolved in 100 parts of water are added and the whole is stirred for 12 hours at 85–90°.

TABLE II

| I No. | II Diazonium compound from— | III Component for the acetic acid coupling | IV Component for the alkaline coupling | V Shade on cotton |
|---|---|---|---|---|
| 12 | 1-amino-4-acetylaminobenzene-2-sulphonic acid. | 1-amino-2-methoxy-5-methylbenzene | 1-hydroxynaphthalene-3,6,8-trisulphonic acid | Blue-grey. |
| 13 | do | do | 1,8-dihydroxynaphthalene-3-6-disulphonic acid. | Grey-green. |
| 14 | do | do | 2-amino-8-hydroxynaphthalene-3,6-disulphonic acid. | Do. |
| 15 | do | do | 2-(3'-sulphophenylamino)-8-hydroxynaphthalene-6-sulphonic acid. | Grey. |
| 16 | do | 1-amino-2,5-dimethoxybenzene | do | Grey green. |
| 17 | do | do | 2-amino-8-hydroxynaphthalene-3,6-disulphonic acid. | Do. |
| 18 | do | do | 2-hydroxynaphthalene-3,6-disulphonic acid | Navy blue. |
| 19 | do | do | 1-hydroxynaphthalene-3,6,8-trisulphonic acid | Grey. |
| 20 | 1-amino-5-acetylaminobenzene-2-sulphonic acid. | do | do | Grey-blue. |
| 21 | do | 1-amino-2-methoxy-5-methylbenzene | do | Navy blue. |
| 22 | do | do | 1-hydroxynaphthalene-3,6-disulphonic acid | Do. |
| 23 | do | do | 1,8-dihydroxynaphthalene-3,6-disulphonic acid. | Navy blue. |
| 24 | do | do | 2-(3'-sulphophenylamino)-8-hydroxynaphthalene-6-sulphonic acid. | Grey. |
| 25 | do | do | 2-amino-8-hydroxynaphthalene-3,6-disulphonic acid. | Green-grey. |

EXAMPLE 26

78.3 parts of the amino disazo dyestuff of the formula

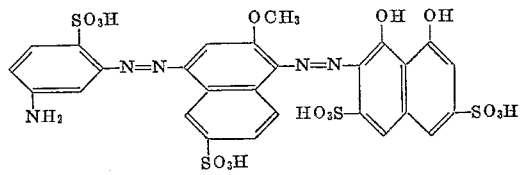

produced by coupling the diazo compound of 1-amino-5-acetylaminobenzene - 2-sulphonic acid with 1-amino-2-methoxynaphthalene - 6 - sulphonic acid in acetic acid medium, diazotising the amino azo dyestuff obtained, coupling with 1,8-dihydroxynaphthalene-3,6-disulphonic acid in the presence of sodium carbonate and pyridine and saponifying the acetylamino group with sodium hydroxide On completion of the coppering, the dyestuff of the formula

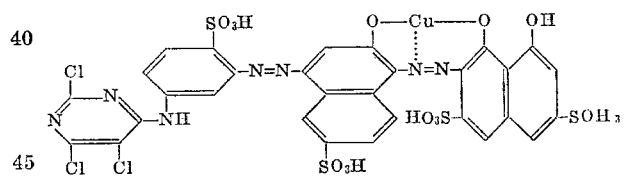

is precipitated by the addition of sodium chloride, isolated, dried in vacuo at 60° and milled. It is a dark powder which dissolves in water with a blue-green colour. It dyes natural or regenerated cellulose fibres from a soda alkaline dye liquid in greenish blue shades which have very good fastness to washing and light.

TABLE III

| I No. | II Diazonium compound from | III Component for the acetic acid coupling | IV Component for the alkaline coupling | V Shade on cotton |
|---|---|---|---|---|
| 27 | 1-amino-5-acetylaminobenzene-2-sulphonic acid. | 1-amino-2-methoxynaphthalene-6-sulphonic acid. | 1-hydroxynaphthalene-3,8-disulphonic acid | Green-blue. |
| 28 | do | do | 1-hydroxynaphthalene-3,6-disulphonic acid | Do. |
| 29 | do | do | 1-hydroxynaphthalene-3,6,8-trisulphonic acid | Do. |
| 30 | do | do | 2-acetylamino-6-hydroxynaphthalene-8-sulphonic acid. | Blue-grey. |
| 31 | do | do | 2-(ω-sulphoacetylamino)-6-hydroxynaphthalene-8-sulphonic acid. | Green-grey. |
| 32 | do | do | 2-(ω-sulphoacetylamino)-8-hydroxynaphthalene-6-sulphonic acid. | Do. |
| 33 | do | do | 2-(4'-carboxyphenylamino)-8-hydroxynaphthalene-6-sulphonic acid. | Grey. |
| 34 | do | do | 2-amino-8-hydroxynaphthalene-3,6-disulphonic acid. | Do. |
| 35 | 1-amino-4-acetylaminobenzene-2-sulphonic acid. | do | do | Green-grey. |
| 36 | do | do | 1-hydroxynaphthalene-3,8-disulphonic acid | Dark green. |
| 37 | do | do | 1-hydroxynaphthalene-3,6,8-trisulphonic acid | Olive green. |
| 38 | do | do | 1-hydroxynaphthalene-3,6-disulphonic acid | Dark green. |
| 39 | do | do | 1-hydroxynaphthalene-8-chloro-3,6-disulphonic acid. | Do. |
| 40 | do | do | 1,8-dihydroxynaphthalene-3,6-disulphonic acid. | Do. |

Dyestuffs having similarly good fastness properties are obtained if, instead of the amino disazo dyestuff described in the above example, the equivalent amount of an amino disazo dyestuff produced with the components mentioned in columns II, III and IV of the preceding Table III is reacted under the conditions described in the example with 2,4,5,6-tetrochloropyrimidine and then converted into the copper complex.

EXAMPLE 41

The amino disazo dyestuff of the formula

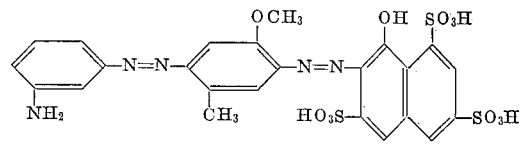

is obtained by diazotising 3-nitro-1-aminobenzene and coupling it in a mineral acid solution with 1-amino-2-methoxy-5-methylbenzene, diazotising the resulting amino monoazo dyestuff, coupling it in the presence of sodium bicarbonate, with 1 - hydroxynaphthalene-3,6,8-trisulfonic acid and reducing the nitro group thereof with sodium sulfide.

65.1 parts of the amino disazo dyestuff thus prepared are dissolved at 80° in 1000 parts of water, mixed with 20 parts of ammonia and 25 parts of copper sulfate and stirred for 8 hours at 80 to 85°. The cupriferous dyestuff begins to separate. It is completely precipitated by the addition of sodium chloride, separated by filtration and dissolved in 600 parts of water at 90°. Then, 21.8 parts of 2,4,5,6 - tetrachloropyrimidine are added, and the pH-value is maintained at 6.5 by gradual dropwise addition of 6 parts of sodium carbonate in 40 parts of water.

After 10 hours, the dyestuff of the formula

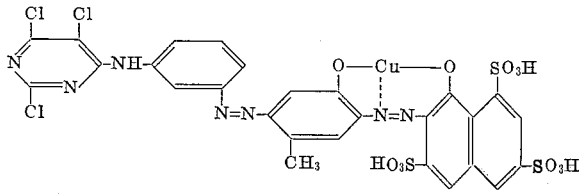

is precipitated with sodium chloride, separation by filtration, dried in vacuo at 80° and ground. It yields a dark powder dissolving in water with a blue shade, in concentrated sulfuric acid with a greenish-blue shade. From a Glauber-salt-containing dye bath made alkaline with sodium hydroxide, it dyes cellulose fibres in deep pure reddish navy blue shades which have excellent fastness to light and washing.

Dyestuffs with similar good properties are obtained if, instead of the amino disazo dyestuff described in the example, equivalent amounts of another amino disazo dyestuff prepared of the components listed in Table IV are treated in the same way with copper sulfate and reacted with 2,4,5,6-tetrachloropyrimidine.

and dyeing is continued for 1 hour at this temperature. The dyeing is then rinsed and soaped at the boil of 15 minutes.

Dyeings having excellent fastness to washing and light are obtained which are not noticeably changed either in shade or in fastness to light by finishing treatment with synthetic resin.

We claim:

1. A fiber-reactive disazo-dyestuff which in its free acid form is of the formula

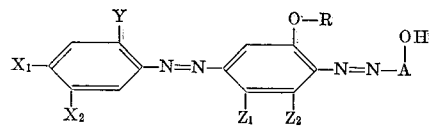

wherein:
one of $X_1$ and $X_2$ represents hydrogen and the other the 2,4,5-trichloropyrimidyl-(6)-amino group,
Y represents a member selected from the group consisting of hydrogen, lower alkyl, lower alkoxy and —$SO_3H$,
$Z_1$ represents a member selected from the group consisting of hydrogen, lower alkyl, lower alkoxy, hydroxy-lower alkoxy and lower alkoxy-lower alkoxy, and
$Z_2$ represents hydrogen, and
$Z_1$ and $Z_2$ taken together represent the grouping

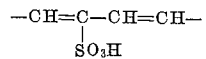

R is a member selected from the group consisting of hydrogen, lower alkyl, hydroxy-lower alkoxy and lower alkoxy-lower alkoxy, and

represents a monovalent hydroxynaphthyl radical the hydroxyl group of which is in ortho-position to the azo bridge linked to A,
the total number of —$SO_3H$ groups ranging from 2 to 4 at least 2 of which are linked to A.

2. A fiber-reactive disazo-dyestuff which in its free acid form is of the formula

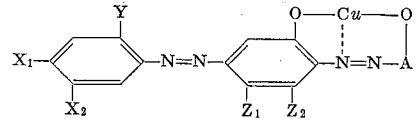

(IB)

wherein:
one of $X_1$ and $X_2$ represents hydrogen and the other the 2,4,5-trichloropyrimidyl-(6)-amino group,
Y represents a member selected from the group con-

TABLE IV

| No. | Nitrodiazonium compound from— | Component for the congo-acid coupling | Component for the alkaline coupling | Shade on cotton |
|---|---|---|---|---|
| 42 | 1-amino-3-nitrobenzene | 1-amino-2,5-dimethoxybenzene | 1-hydroxynaphthalene-3,6,8-trisulphonic acid | Greenish navy blue. |
| 43 | 1-amino-4-nitrobenzene | do | do | Olive green. |
| 44 | do | 1-amino-2-methoxy-5-methylbenzene | do | Reddish navy blue. |
| 45 | 1-amino-3-nitrobenzene | 1-amino-2-ethoxybenzene | do | Do. |
| 46 | 1-amino-2-methyl-5-nitrobenzene | 1-amino-2-methoxy-5-methylbenzene | do | Navy blue. |

EXAMPLE 47

A dyebath is prepared by dissolving 2 parts of the dystuff described in example 1 in 1000 parts of water and adding 20 parts of sodium carbonate. 100 parts of cotton are introduced at 40°, the bath is heated to 90–95° within 30 minutes, 80 parts of sodium sulphate are added sisting of hydrogen, lower alkyl, lower alkoxy and —$SO_3H$,
$Z_1$ represents a member selected from the group consisting of hydrogen, lower alkyl, lower alkoxy, hydroxy-lower alkoxy and lower alkoxy-lower alkoxy, and $Z_2$ represents hydrogen, and
$Z_1$ and $Z_2$ taken together represent the grouping

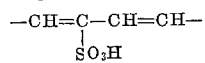

and

represents a divalent oxynaphthyl radical whereof the oxygen is linked to A in ortho-position to the azo bridge linked to A,
the total number of —SO$_3$H groups ranging from 2 to 4 at least 2 of which are linked to A.

3. A disazo dyestuff which in its free acid form is of the formula

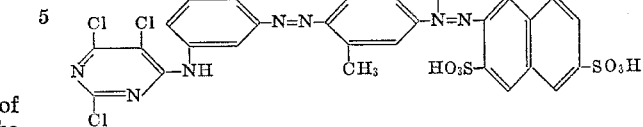

4. A disazo dyestuff which in its free acid form is of the formula

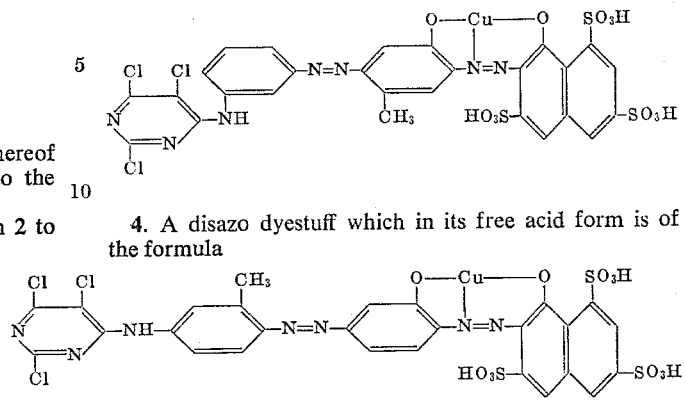

5. A disazo dyestuff which in its free acid form is of the formula

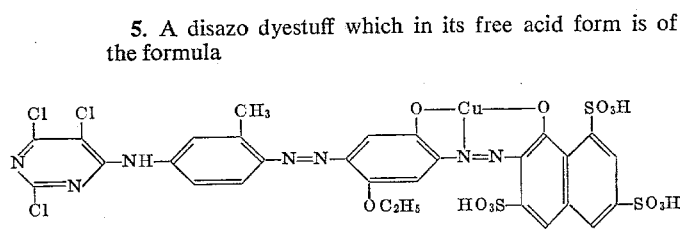

6. A disazo dyestuff which in its free acid form is of the formula

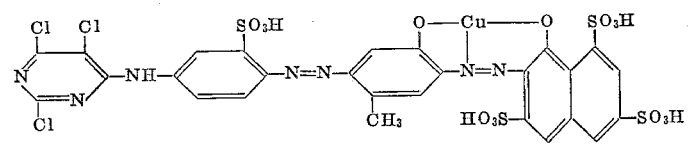

7. A disazo dyestuff which in its free acid form is of the formula

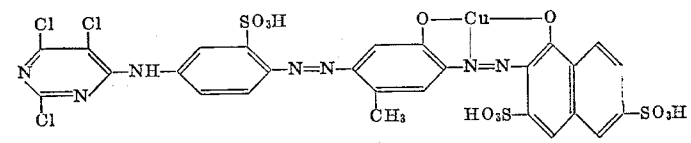

References Cited

UNITED STATES PATENTS 3,234,204  2/1966  Benz et al. _____ 260—146

FOREIGN PATENTS 242,902  12/1962  Australia.

CHARLES B. PARKER, *Primary Examiner.*

D. M. PAPUGA, *Assistant Examiner.*